United States Patent
Pandey et al.

(10) Patent No.: US 11,170,012 B2
(45) Date of Patent: Nov. 9, 2021

(54) DETERMINING SESSION COUNT OF UNIQUE SESSIONS FOR REQUESTED TIME PERIODS

(71) Applicant: COLORTOKENS, INC., Santa Clara, CA (US)

(72) Inventors: Arun Chandra Pandey, Bangalore (IN); Natarajan Venkataraman, Bangalore (IN)

(73) Assignee: COLORTOKENS, INC., Santa Clara, CA (US)

( * ) Notice: Subject to any disclaimer, the term of this patent is extended or adjusted under 35 U.S.C. 154(b) by 216 days.

(21) Appl. No.: 16/272,895

(22) Filed: Feb. 11, 2019

(65) Prior Publication Data

US 2020/0257687 A1    Aug. 13, 2020

(51) Int. Cl.
*G06F 16/2458* (2019.01)
*G06F 9/451* (2018.01)
*G06F 16/22* (2019.01)
*G06F 16/248* (2019.01)

(52) U.S. Cl.
CPC .......... *G06F 16/2477* (2019.01); *G06F 9/451* (2018.02); *G06F 16/22* (2019.01); *G06F 16/248* (2019.01)

(58) Field of Classification Search
CPC ...... G06F 16/2477; G06F 9/451; G06F 16/22; G06F 16/248
See application file for complete search history.

(56) References Cited

U.S. PATENT DOCUMENTS

| | | | |
|---|---|---|---|
| 2008/0104046 A1* | 5/2008 | Singla | H04L 29/12783 |
| 2008/0140697 A1* | 6/2008 | Papadimitriou | G06F 16/958 |
| 2009/0043748 A1* | 2/2009 | Maghoul | G06F 16/2477 |
| 2009/0327915 A1* | 12/2009 | Holdaway | G06F 9/451 715/745 |
| 2013/0212654 A1* | 8/2013 | Dorfman | H04L 63/102 726/5 |

* cited by examiner

*Primary Examiner* — Pierre M Vital
*Assistant Examiner* — Andrew N Ho
(74) *Attorney, Agent, or Firm* — Barry Choobin; Patent 360LLC

(57) ABSTRACT

A method and system for determining a session count is described. At a user interface a request is received to determine a session count for a time period. Based on the received request, the session count is determined based on unique new session counts corresponding to one or more time intervals included in the time period and carry forward session count corresponding to an initial time interval included in the time period. Finally, the determined session count is displayed at the user interface.

10 Claims, 6 Drawing Sheets

| Partition | Time Range | New Connections | Existing |
|---|---|---|---|
| 11:30:00 | 11:30:00-11:59:59 | 0 | 3 |
| 11:00:00 | 11:00:00-11:29:59 | 5 | 2 |
| 10:30:00 | 10:30:00-10:59:59 | 4 | 3 |
| 10:00:00 | 10:00:00-10:29:59 | 5 | 0 |

| Run time from UI | 30 MINUTES | 1 HOUR | 1 HOUR 30 MINUTES | 2 HOURS |
|---|---|---|---|---|
| 10:29:59 | 5+0 = 5 | | | |
| 10:59:59 | 4+3 = 5 | 4+5+0 = 9 | | |
| 11:29:59 | 5+2 = 7 | 5+4+3 = 12 | 5+4+5+0 = 14 | |
| 11:59:59 | 0+3 = 3 | 0+5+2 = 7 | 0+5+4+3 = 12 | 0+5+4+5+0 = 14 |

FIG. 6

DETERMINING SESSION COUNT OF UNIQUE SESSIONS FOR REQUESTED TIME PERIODS

BACKGROUND

Web analytics is the collection, reporting, and analysis of website data. This analytics data is used to identify and understand the usage pattern of the website. Typically, a lot of unique sessions are established between different devices, including data servers, during accessing the website. Web analytics also include the process of monitoring and reporting active session details for a particular time period.

One of die issue with determining unique count session is count-distinct problem. The count-distinct problem is the problem of finding the number of distinct elements in a data stream with repeated elements. One of the solutions for die count-distinct problem either determine an approximate count of the sessions, by techniques such as HyperLogLog. This solution determines an approximate count value and is therefore undesirable.

Another solution includes storing the entire session data in big database and then determining the required unique count from the stored data. A session count is requested for only a particular time period and the process of storing data in big database and then analyzing it is both time consuming and resource intensive.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 6 is an exemplary table illustrating a session count determined for different time periods based on the session count table of FIG. 5, according to an embodiment.

DETAILED DESCRIPTION

Figure 1:
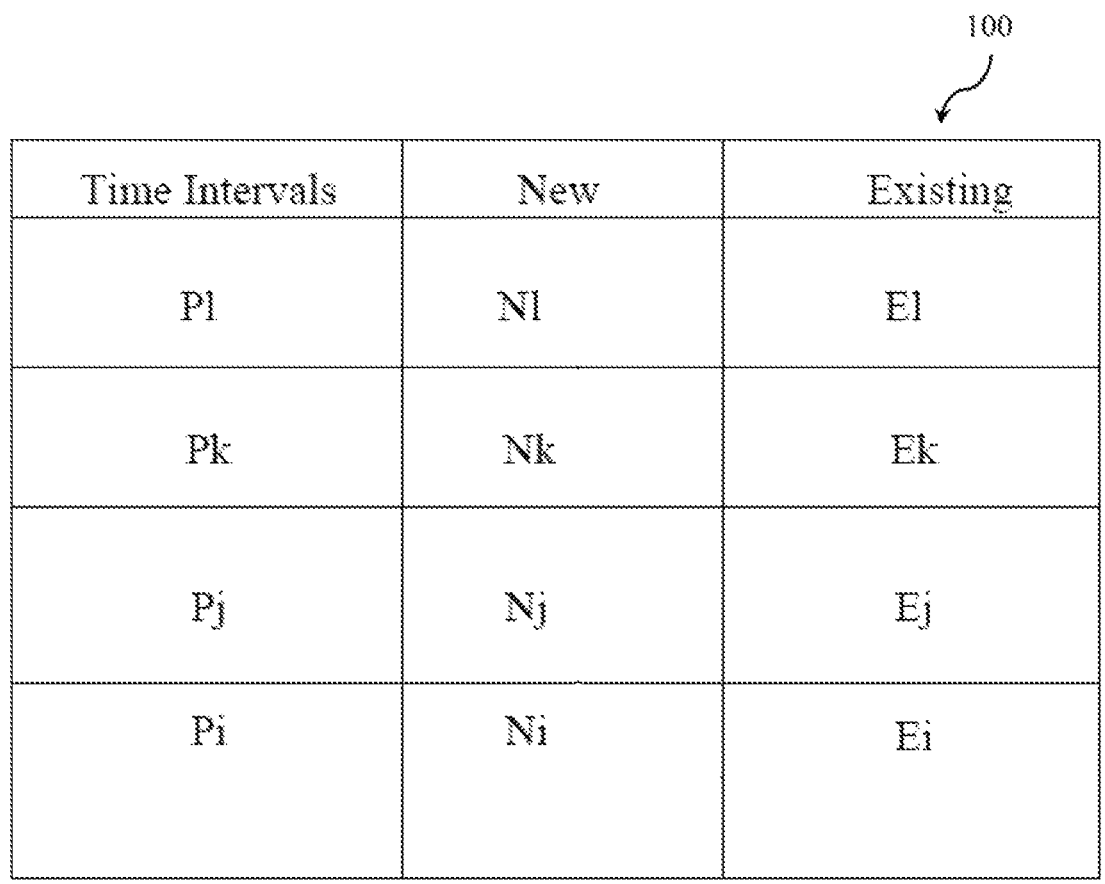
FIG. 1 is a block diagram illustrating an exemplary session count data that is used to determine session count for a time period, according to an embodiment.

Embodiments of techniques of determining session count of unique sessions for a requested time period are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In networking, a session is a temporary and interactive information interchange between two or more communicating devices, or between a computer and user (see login session). A session is established at a certain point in time, and then 'torn down'—brought to an end—at some later point. An established communication session may involve more than one message in each direction A session is typically stateful, meaning that at least one of the communicating parties needs to hold current state information and save information about the session history in order to be able to communicate, as opposed to stateless communication, where the communication consists of independent requests with responses.

In one embodiment, a session is an active communication session between two devices. A device may be a computer, laptop, handheld device, server within a server. Session count is the count of active sessions. The session count may be determined for a particular rime period. At any particular time period, there may be several new sessions that are established during the time period and carry forward sessions that were established prior to the current time period and are still active.

As each time interval includes a combination of new sessions and still active sessions there is a lot of duplicate session information, for each time period, which leads to incorrect session count. The present invention solves this problem by determining a session count for each unique new session and each carry forward session established during a particular pre-determined time interval. For example, a pre-determined time interval may be 30 minutes. In this example, the session count is determined for each unique new session and each carry forward session established from a time interval, 10:00:00 to 10:29:59. The carry forward session may be session that started before 10:00:00 and are active between 10:00:00 to 10:29:59.

The new and carry forward session counts determined for each time interval is then used to determine a session count for a particular time period. Session count for a particular time period may be determined based on the new and carry forward session counts determined for time intervals included in the particular time period. For example, when session count of last 1.5 hours is sent at 11:30 then the determined unique new and carry forward session counts for the three-time intervals between 10:00 to 11:30, assuming a session interval of half hour, are used to determine the session counts.

FIG. 1 is a block diagram illustrating an exemplary session count data 100 that is used to determine session count for a time period, according to an embodiment. As shown, session count data is determined for five equal time intervals. Pi to Pl, where Pi is the initial time period and Pl is the latest time period. For example, if the session count data is determined from 12:00 to 2:00 and the time interval is 30 minutes then Pi is from 12.00 to 12:30. In this example, Pl is the last time interval from 1:30 to 2:00 pm.

As shown, each time interval has a unique new session count and carry forward count for the time interval. For example, the unique new session count for time interval Pi is Ni and the unique carry forward existing session in this time period is represented by Ei. Similar unique session count for other time intervals are determined. In case a request is received to determine the session count for time period Pi→Pl then the new session count for each session from Pi to Pl are summed with the carry forward existing session count for the earliest time interval, i.e. Pi, for the given time period. Session Count (for window 'i' to 'l') $=\Sigma_{p=i}^{l} N_p + E_i$ Summing only the new session counts for time intervals in the particular time period with any existing session count for a time interval at the beginning of the time interval ensures that no session overlap information is used during the determination of the session count for the requested time period.

Figure 2:
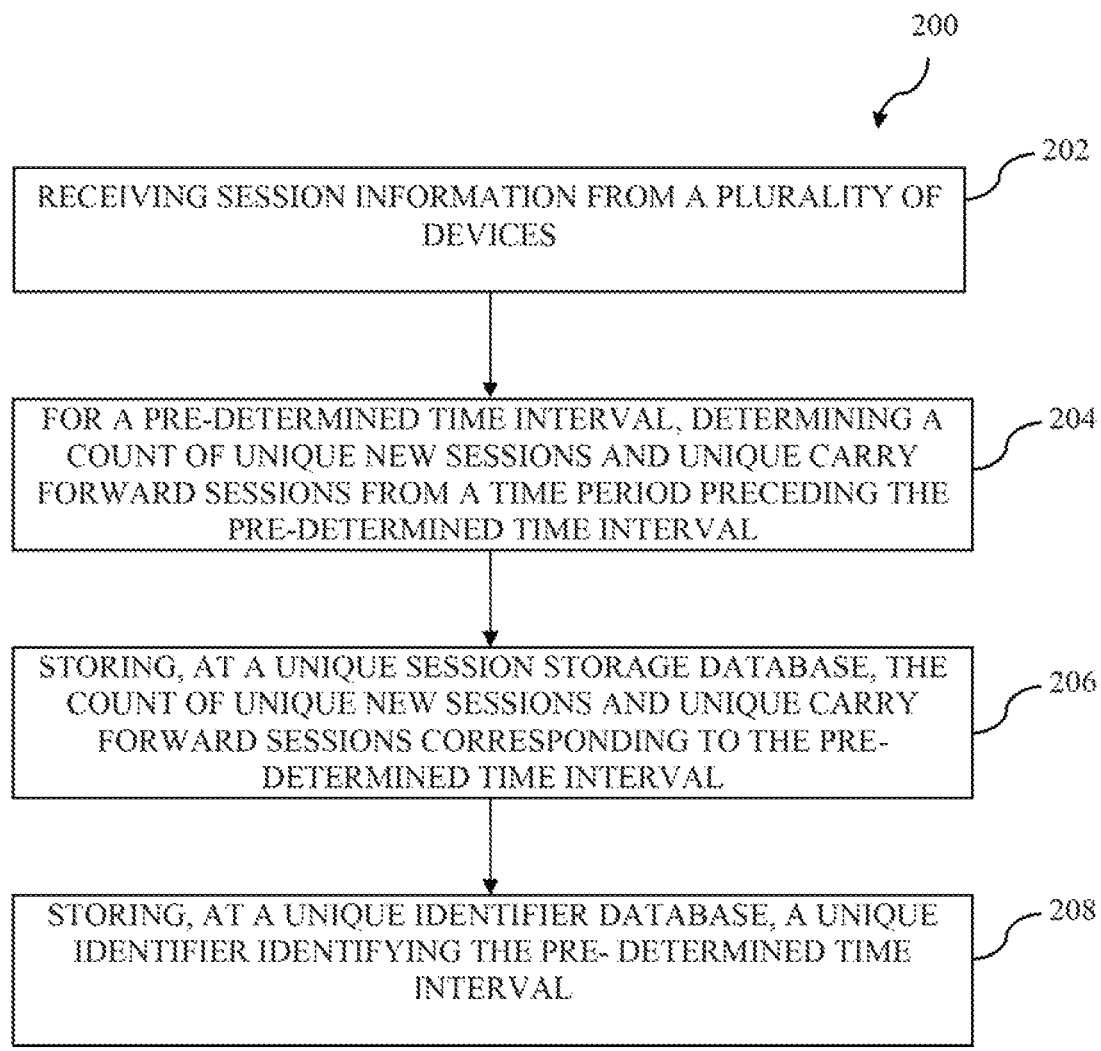
FIG. 2 is a flow diagram illustrating a process for determining a unique session counts for one or more time intervals, according to an embodiment.

FIG. 2 is a flow diagram illustrating a process 200 for determining a unique session counts for one or more time intervals, according to an embodiment. Initially at 202 a session information is received front the plurality of devices. The session information includes different information related to various sessions established between different devices. The session information is received by a session recorder executing at the devices.

Next, for a pre-determined time interval, a count of unique new sessions and unique carry forward sessions from preceding pre-determined time interval is determined (204). Pre-determined time period may be set by a user or may be automatically set. A unique new session count may be determined by incrementing a new session count for each new session established during a new time interval. The carry forward session count is also updated whenever a new time interval starts.

The determined count of unique new sessions and unique carry forward sessions is forwarded to databases. In one embodiment, the count of unique new session and unique carry-forward session and corresponding pre-determined time intervals are stored at unique session storage database (206). In one embodiment, the unique session storage database may be a Cassandra database. In one embodiment, unique keys representing unique new session count and unique carry forward session count corresponding to a predetermined time interval is stored in a unique identifier database (208). The unique key is used for searching the unique new session count and unique carry forward session count corresponding to a time interval and then determine the session count for a requested time period.

Figure 3:
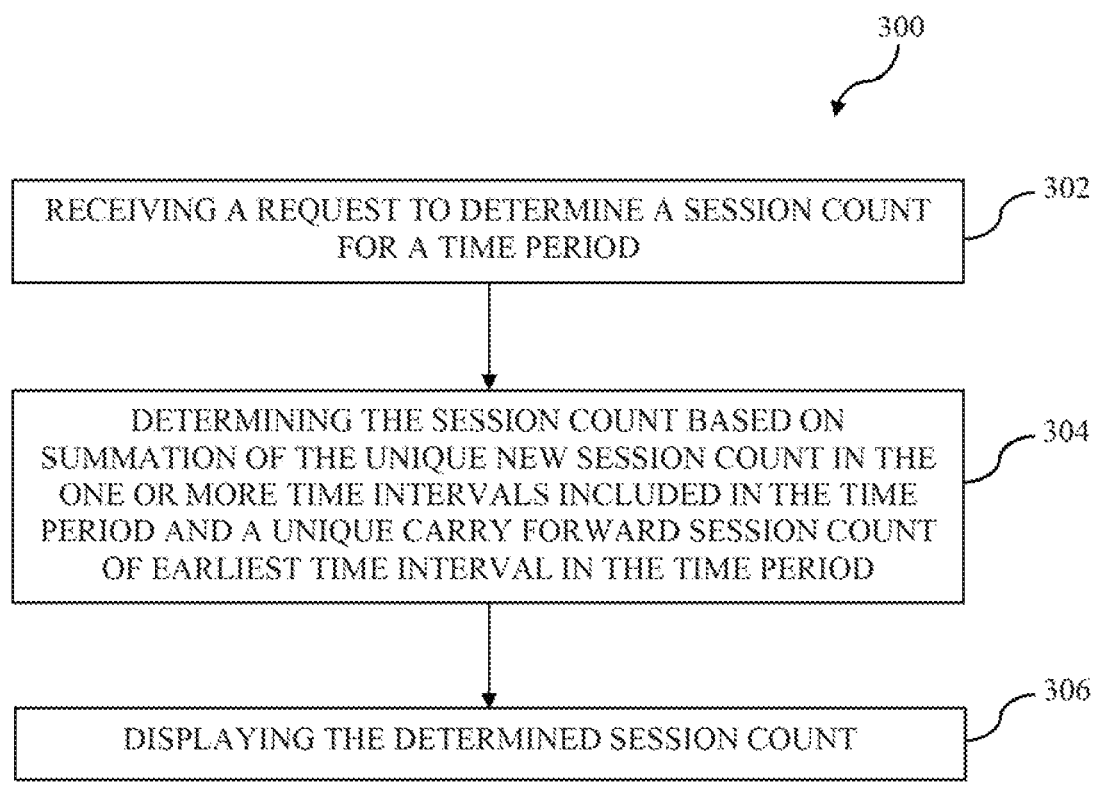
FIG. 3 is a flow diagram illustrating a process to determine a session count for a time period, according to an embodiment.

FIG. 3 is a flow diagram illustrating a process to determine a session count for a time period, according to an embodiment. A request is received to determine the session count for a time period (302). The session count may be received at a user interface of a analytics platform. Based on the received request, the session count for the time period is determined based on summation of unique new session count in one or more time intervals included in the time period and a unique carry forward session count of earliest time interval in the time period (304). In one embodiment, based on the received request a request is sent to the unique identifier database to identify a primary key corresponding to the time intervals included in the unique time period.

Based on the determined primary key, the unique session storage database is searched to retrieve the unique new session and unique carry forward session corresponding to the pre-determined lime intervals. The unique new-sessions in these time-intervals and the unique carry forward session of the earliest time interval is then summed to determine the session count.

Finally, the determined session count is displayed at the user interface (306).

Figure 4:
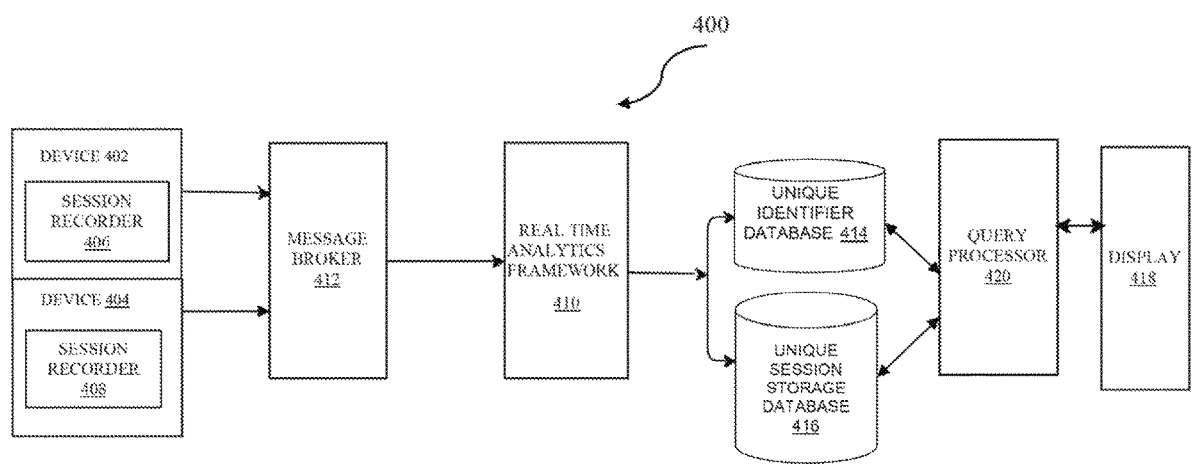
FIG. 4 is a block diagram illustrating high level architecture of a system to determine the session count for a time period, according to one embodiment.

FIG. 4 is a block diagram illustrating high level architecture of a system 400 to determine the session count for a time period, according to one embodiment. Each of the devices 402 and 404 execute a session recorder 406 and 408, respectively. The session recorders 406 and 408 capture the "session information" including different sessions being established by devices 402 and 404, respectively.

The session recorder 406 and 408 then forward the session information to a real time analytics framework 410 via a message broker 412. The real time analytics broker does real-time processing and aggregation on the received session information to generate a unique new session count and unique existing session count for different time intervals. The processed data is then pushed to unique identifier database 414 and unique session storage database 416.

The partition feature of unique session storage database 416 is used to store sessions for particular timeslots in specific partitions. For each partition of unique session storage database 416, two counters are maintained, ie. (a) a counter of unique new sessions that were created during this partition time interval, (b) a counter of unique sessions that are still alive in the current partition time interval.

The unique identifier database 414 is used for filtering the records and get the primary keys. For each partition, we use the primary key from unique identifier database 414 to query and get table entries, from the unique session storage database 416, which have the same primary key and has aggregated values like new session counts, existing session counts, bytes transferred etc.

When a request to determine session count for a particular time period is received at the display 418 then it sends a query to a query processor 420 that sums the new session counts and existing session counts to get the corresponding counts at the partition level.

Figure 5:
FIG. 5 is an exemplary session count table illustrating a session count for different time intervals, according to an embodiment.

FIG. 5 is an exemplary session count table 500 illustrating a session count for different time intervals, according to an embodiment. As shown in table 500, the new and existing session count for 30 minutes time intervals from 10:00:00 to 11:59:59 is stored. In one embodiment, the table 500 is stored in the unique session storage database.

FIG. 6 is an exemplary table 600 illustrating a session count determined for different time periods based on the session count table 500 of FIG. 5, according to an embodiment. The table shows the session count based on the time interval at which the session count determination was requested at UI represented by "run time from UI" for selected time periods. As shown, when the "runtime from UI" is triggered at 10:29:59 then there is only a current session data of 5. However, when the "runtime from UI" is triggered at 11:59:59 then all the new connection from 10:00 to 11:59:59 are added along with the existing connection count at 10:00.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs. DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly-machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art w ill recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant an will recognize. These modifications can be made in light of the above detailed description. Rather, the scope is to be determined by the following claims, which are to be interpreted in accordance with established doctrines of claim construction.

What is claimed is:

1. A computer-implemented method for determining session count for a predetermined time period in a networked computing environment incorporating at least one computer-based device, said method comprising the following computer-implemented steps:

in response to receiving a request for determining said session count for said predetermined time period, programmatically dividing, by a processor installed within said computer-based device, said predetermined time period into a plurality of equal time intervals;

determining, by said processor, for each of said plurality of time intervals, unique new sessions established therein, and further determining unique carry forward sessions corresponding to an earliest time interval among said plurality of time intervals;

summating, by said processor, said unique new sessions established during each of said plurality of time intervals and said unique carry forward sessions, by executing a programmatic representation of a formula:

$$\left(\sum_{p=i}^{I} N_p\right) + E_i$$

wherein 'p' denotes said plurality of time intervals, '$N_p$' denotes said unique new sessions established for each of said plurality of time intervals, and '$E_i$' denotes said unique carry forward sessions corresponding to said earliest time interval;

obtaining, by said processor, a summation result based on execution of said formula and further based on a summation of said unique new sessions and said unique carry forward sessions, and determining said summation result as said session count for said predetermined time period;

and wherein said summation of said unique new sessions established during each of said plurality of time intervals, with said unique carry forward sessions corresponding to said earliest time interval, prevents use of session overlap information in determination of said session count.

2. The method as claimed in claim 1, wherein said 'p' extends from 'i' up to 'I', and wherein said 'i' denotes said earliest time interval corresponding to said predetermined time period and said 'I' denotes a last time interval corresponding to said predetermined time period.

3. The method as claimed in claim 1, wherein the method further includes the step of programmatically representing through respective unique keys, said unique new sessions and said unique carry forward sessions corresponding to each of said plurality of time intervals.

4. The method as claimed in claim 3, wherein the method further includes the following steps:

storing said unique sessions and said unique carry forward sessions corresponding to each of said plurality of time intervals, on a session storage database; and storing said unique keys on an identifier database.

5. A computer-implemented system for determining session count for a predetermined time period in a networked computing environment incorporating at least one computer-based device, said system comprising:

a processor installed within said computer-based device;

a memory module installed within said computer-based device and communicably coupled to said processor, said memory module storing computer program code, wherein said memory module and computer program code stored therein are configured, with the processor, to:

in response to receiving a request for determining said session count for said predetermined time period, programmatically divide said predetermined time period into a plurality of equal time intervals;

determine, for each of said plurality of time intervals, unique new sessions established therein, and further determine unique carry forward sessions corresponding to an earliest time interval among said plurality of time intervals;

summate said unique new sessions established during each of said plurality of time intervals and said unique carry forward sessions, by executing a programmatic representation of a formula:

$$\left(\sum_{p=i}^{I} N_p\right) + E_i$$

wherein 'p' denotes said plurality of time intervals, '$N_p$' denotes said unique new sessions established for each of said plurality of time intervals, and '$E_i$' denotes said unique carry forward sessions corresponding to said earliest time interval; and obtain a summation result based on execution of said formula and further based on a summation of said unique new sessions and said unique carry forward sessions, and determine said summation result as said session count for said predetermined time period;

and wherein said summation of said unique new sessions established during each of said plurality of time intervals, with said unique carry forward sessions corresponding to said earliest time interval, prevents use of session overlap information in determination of said session count.

6. The system as claimed in claim 5, wherein said processor is further configured to programmatically implement said formula, with said 'p' extending from 'i' up to 'I', and wherein said 'i' denotes said earliest time interval corresponding to said predetermined time period and said 'I' denotes a last time interval corresponding to said predetermined time period.

7. The system as claimed in claim 5, wherein said processor is further configured to programmatically associate said unique new sessions and said unique carry forward sessions corresponding to each of said plurality of time intervals, with respective unique keys.

8. The system as claimed in claim 7, wherein said processor is further configured to trigger a session storage database to store said unique sessions and said unique carry forward sessions corresponding to each of said plurality of time intervals, said processor further configured to trigger an identifier database to store said unique keys.

9. A non-transitory computer-readable storage medium having computer-executable instructions stored thereon, said computer-executable instructions, when executed by a processor, cause said processor to:

in response to receiving a request for determining a session count for a predetermined time period, programmatically divide said predetermined time period into a plurality of equal time intervals;

determine, for each of said plurality of time intervals, unique new sessions established therein, and further determine unique carry forward sessions corresponding to an earliest time interval among said plurality of time intervals;

summate said unique new sessions established during each of said plurality of time intervals and said unique carry forward sessions, by executing a programmatic representation of a formula:

$$\left(\sum_{p=i}^{I} N_p\right) + E_i$$

wherein 'p' denotes said plurality of time intervals, '$N_p$' denotes said unique new sessions established for each of said plurality of time intervals, and '$E_i$' denotes said unique carry forward sessions corresponding to said earliest time interval; and obtain a summation result based on execution of said formula and further based on a summation of said unique new sessions and said unique carry forward sessions, and determine said summation result as said session count for said predetermined time period;

and wherein said summation of said unique new sessions established during each of said plurality of time intervals, with said unique carry forward sessions corresponding to said earliest time interval, prevents use of session overlap information in determination of said session count.

10. The computer-executable instructions as claimed in claim 9, wherein said computer-executable instructions, when executed by said processor, further cause said processor to:

programmatically implement said formula, with said 'p' extending from 'i' up to 'I', and wherein said 'i' denotes said earliest time interval corresponding to said predetermined time period and said 'I' denotes a last time interval corresponding to said predetermined time period;

programmatically associate said unique new sessions and said unique carry forward sessions corresponding to each of said plurality of time intervals, with respective unique keys; and trigger a session storage database to store said unique sessions and said unique carry forward sessions corresponding to each of said plurality of time intervals, said processor further configured to trigger an identifier database to store said unique keys.

* * * * *